United States Patent [19]

Heitmann et al.

[11] Patent Number: 4,939,605
[45] Date of Patent: Jul. 3, 1990

[54] APPARATUS INCLUDING A HEAD WHEEL CARRYING ADVANCED READ, WRITE AND NORMAL READ HEADS FOR FACILITATING PROCESSING OF TELEVISION AUDIO SIGNALS RECORDED ON MAGNETIC TAPE

[75] Inventors: Jürgen Heitmann, Alsbach; Rolf Loos, Münster; Hannfried Preissler, Darmstadt, all of Fed. Rep. of Germany

[73] Assignee: Robert Bosch GmbH, Stuttgart, Fed. Rep. of Germany

[21] Appl. No.: 286,317

[22] Filed: Dec. 19, 1988

[30] Foreign Application Priority Data

Dec. 24, 1987 [DE] Fed. Rep. of Germany ....... 3744077

[51] Int. Cl.$^5$ ...................... G11B 27/02; H04N 5/782
[52] U.S. Cl. .................................. 360/14.1; 360/19.1; 360/33.1; 358/343; 358/335
[58] Field of Search ................. 360/84, 14.1, 13, 19.1, 360/64, 33.1, 86, 53, 10.3; 358/343, 335; 379/133

[56] References Cited

U.S. PATENT DOCUMENTS

| | | | |
|---|---|---|---|
| 4,197,427 | 4/1980 | Hutcheson | 379/133 |
| 4,415,938 | 11/1983 | Heitmann | 360/53 |
| 4,513,315 | 4/1985 | Dekker et al. | 358/86 |
| 4,597,020 | 6/1986 | Wilkinson | 360/33.1 |
| 4,723,176 | 2/1988 | Ive | 358/343 |
| 4,821,132 | 4/1989 | Hasegawa | 360/84 |

OTHER PUBLICATIONS

"Standard for Recording Digital Television Signals on Magnetic Tape in Cassettes", EBU, Tech. 3252-E, Sep. 1986.
Fernseh- und Kino-Technik, 1987, pp. 15-22.

Primary Examiner—Vincent P. Canney
Assistant Examiner—W. Daniel Swayze
Attorney, Agent, or Firm—Frishauf, Holtz, Goodman & Woodward

[57] ABSTRACT

The head wheel of a video recorder-reproducer is equipped with a set of four advanced read heads, in addition to the usual sets of four read and write heads, so that each advanced read head can read the contents of an oblique track on a magnetic tape on which one of the write heads will be able to record thereafter and which will be read still later by one of the normal read heads. The advanced read heads are so located that while one of them is reading a track, one of the normal read heads is out of contact with the tape. The advanced read heads are used for reading out audio sections of video tape tracks for processing and rerecording in accordance with a previously known processing procedure used in editing newly recorded video tapes for better audio recording. The normal read heads are available for an after-check of the rerecorded audio. A switching system timed by the rotation of the head wheel disconnects each of the normal read heads in a sequence during the periods in which they are respectively out of contact with the tape and at the same time the switches in one of the advanced read heads for scanning the mid-portion of the recorded tracks where the audio sections of the recording are located.

20 Claims, 5 Drawing Sheets

APPARATUS INCLUDING A HEAD WHEEL CARRYING ADVANCED READ, WRITE AND NORMAL READ HEADS FOR FACILITATING PROCESSING OF TELEVISION AUDIO SIGNALS RECORDED ON MAGNETIC TAPE

Cross References To Related Co-Pending Applications

P 37 18 566; Ser. No. 07/198,135; filed May 24, 1988; Atty. Dkt.: 88152/W

P 37 19 404; Ser. No. 07/198,131; filed May 24, 1988; Atty. Dkt.: 88162/W

P 37 18 567; Ser. No. 07/193,903; filed May 13, 1988; Atty. Dkt.: 88151/W

P 37 18 406; Ser. No. 07/202,192; filed June 2, 1988; Atty. Dkt.: 88160/W

This invention concerns apparatus that can be combined with, or make use of, a conventional system for recording television signals on, and reproducing them from, a magnetic tape so that the equipment will be capable of reading out audio signals from the tape, processing them and writing processed signals in place of the read out audio signals.

The kind of processing that is desired for audio signals recorded on a magnetic tape is well known in the art and does not need to be described here, but much difficulty has up to now been involved in reading out the originally recorded audio signals, processing them and using the processing output to replace the originally recorded audio signals.

A well known process for magnetic recording of digitally coded television signals involves sampling the analog values, quantization and coding, with addition of identification information and data protecting values (for error correction) and then transmitting the data in serial blocks. On account of the overall transmission capacity that is needed in the known magnetic tape equipment for recording and/or reproducing digitally coded television signals, recording is done in four parallel channels with correspondingly narrower transmission bandwidths. Four magnetic heads are accordingly provided for recording, disposed around the circumference of a rotary head wheel at equals spacings and likewise four magnetic heads for signal reproduction are similarly provided on the same head wheel. The recording heads hereinafter referred to as write heads and the usual reproduction heads are hereinafter referred to as normal read heads.

The angle of envelopment of the magnetic tape in contact with the head wheel is 258°. The four read heads successively pass in contact with the magnetic tape and describe individual tracks running obliquely to the longitudinal direction of the magnetic tape. Each of these tracks contains two track sections known as sectors, containing video data which are separated, in the region of the longitudinal median line of the tape, by several short track sections which contain different sound information. The normal read heads, as already mentioned, are four in number and are so disposed that they can read the tracks that have just been recorded and provide an immediate reproduction of the recorded signals, an operation known as an after-check. Further details of this known system are given in the printed publication "Standard for Recording Digital Television Signals on Magnetic Tape in Cassettes" of the European Broadcasting Union, Tech. 3252-E and in the periodical Fernseh- und Kinotechnik 1987, Heft. 1/2, pages 15–22.

It has been found advantageous, as already mentioned to provide processing of audio signals which have already been recorded on magnetic tape involving the reproduction of the recorded audio signals, processing them and then recording them directly on the same magnetic tape in place of the originally recorded signals. The processing can take place in a mixing with other signals. When the recording and reproduction involves several channels, audio processing may involve mixing among them and also changing the overall frequency characteristic, the amplitude level and the dynamic adjustment or setting.

It is quite impossible to carry out the above-described known method of editing of audio signals in a single pass of the tape with the known video tape equipment as usually provided or within the heretofore known modifications. The normal read heads scan the recorded tracks after the passage of the write heads over those same tracks, for reasons of after-check possibilities for the signals read out, and processed audio signals cannot be recorded by that equipment in the place of the original signals read out on the same pass of the tape. The editing process as heretofore carried out by the use of conventional equipment for reading the audio signals has accordingly been complicated and expensive.

SUMMARY OF THE INVENTION

It is an object of the present invention to modify the known kind of video tape equipment at low additional cost so that the audio signals can be read out and, after processing, replaced in a single pass of the tape through the modified equipment.

Briefly, the head wheel is modified so as to carry, in addition to the write heads and normal read heads, four advanced read heads which will read the recorded signals before the track sections in which they are recorded pass under the write heads. The advanced read heads are disposed at such an angular spacing from the normal read heads in terms of the angle of rotation of the wheel that while one of the advanced read heads is reading a section of track on the tape allocated to audio signal recording, one of the normal read heads is out of contact with the tape. This makes possible advance read out and processing that can be completed in time for recording instead of the unprocessed signal on the tape by the write heads, while the normal read heads and advance read heads can both be used without interference with each other. Particular advantage is that editing of audio signals of two audio channels at the same time becomes possible. These could be two independent channels, a stereo pair or a two-tone pair. It is also advantageous that an after-check is possible and that no delay of the audio signals relative to the video signals is produced by the editing.

The increase of expense of the video tape equipment for this modification is relatively insignificant.

Certain particular arrangements for time multiplexing and demultiplexing the contents of the audio sections recorded on the tape are useful in the practice of the invention and their nature will be better understood after the illustrated explanation that follows:

BRIEF DESCRIPTION OF THE DRAWINGS

The invention is further described by way of illustrative example with reference to the annexed drawings, in which.

The same parts and components are designated by the same numerals in the various figures.

DESCRIPTION OF THE ILLUSTRATED EMBODIMENTS

Figure 1:
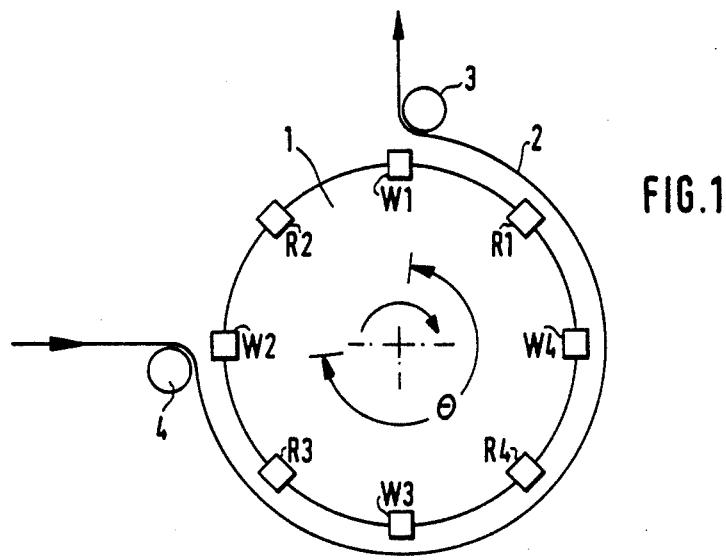
FIG. 1 is a diagram of a tape scanning device having four write heads and four normal read heads conventionally arranged on a head wheel.

FIG. 1 schematically shows a head wheel 1, at the periphery of which there are arranged four normal read heads R1, R2, R3 and R4, at successive spacings of 90° around the periphery, and four write heads W1, W2, W3 and W4 likewise at successive spacings of 90°. The head wheel 1 rotates in the direction of the arrow in FIG. 1 and is enveloped by a magnetic tape 2 that is fed around a guide roller 3, around the head wheel and then around another guide roller 4. The envelopment angle $\theta$ is 258°, so that at least two of the write heads and at least two of the normal read heads are in contact with the tape and most of the time even three of them. The guide rollers 3 and 4 are disposed at different heights, a fact which is not visible in FIG. 1, so that the tracks written or scanned by the magnetic heads are at an angle with the longitudinal direction of movement of the tape.

Because of the high bit rate of 227 Mbits/s the data stream is subdivided and distributed over four channels according to a scheme in which there is no fixed correlation between the magnetic heads and the channels laid down by their respective portions of the data stream. The details of these aspects of the recording and reproducing preparation are to be found in the printed publication of the European Broadcasting Union (EBU) "Standard for Recording Digital Television Signals on Magnetic Tape in Cassettes", First Edition, Sept. 1986.

In the publication just cited the track pattern is defined which will be explained in what follows in connection with FIG. 2.

Figure 2:
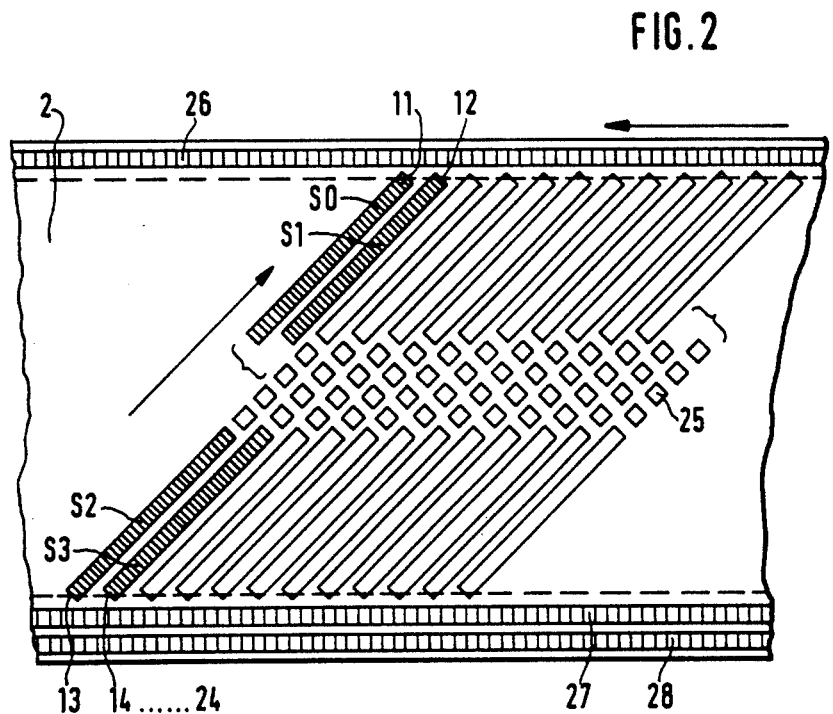
FIG. 2 is a diagram of a section of the track pattern on the magnetic tape in accordance with the known standard method of recording.

For purposes of clearer illustration the width of the tracks and the angles between the tracks and the longitudinal direction of the tape are considerably magnified in FIG. 2. Furthermore, the length of the individual track sections is not reproduced to scale.

In each case one track 11 ... 24 ... is produced by a quarter revolution of the head wheel and a lengthwise movement of the tape 2. With every quarter revolution of the head wheel one head writes one track which comprises two sector track sections 25 for audio data. A more accurate representation of the track sections 25 is contained in the above-cited publication.

Four sectors S0 ... S3 always form one segment of a field. The first segment of a field is therefore recorded, in the representation of FIG. 2, in the sectors S0, S1, S2 and S3.

With reference to the European 625 line standard there are accordingly the following values:

In 12 tracks there are the data of 300 lines of a field. (the vertical blanking interval is not recorded), each of four sectors, for example the sectors S0, S1, S2, S3, containing the information of 50 lines. In the recording of video signals according to the 525 line standard of the U.S., only 250 lines are recorded per field, so that 10 tracks are needed, instead of the 12 tracks needed for a field under the European 625 line standard. In addition to the oblique tracks three longitudinal tracks are provided on the tape, one of them a so-called CUE-Audio track 26 is for recording supplementary sound information, a control track 27 serves for control of the tape transport and a time code track 28 serves for recording and reproduction of time code signals.

Figure 4:
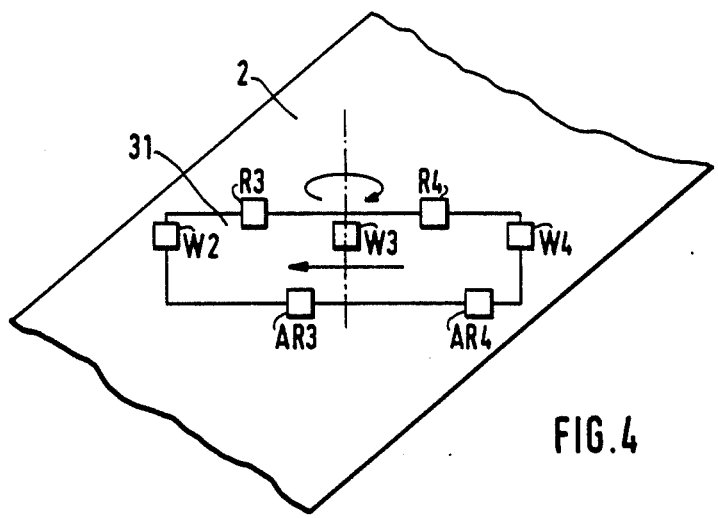
FIG. 4 is a schematic side view of the head wheel of FIG. 3 at the side shown at the bottom of FIG. 3, with the tape not being shown as in FIG. 3 but in an entirely diagramatic representation to illustrate the direction of tape motion.

In addition to the magnetic heads already illustrated in FIG. 1, there are also advanced read heads AR1, AR2, AR3 and AR4 on the head wheel 31. These advanced read heads are located in a plane of the head wheel 31 which the magnetic tape 2 moving in the direction of the arrow meets firsts. In the side view shown in FIG. 4 only two of the normal read heads and only two of the advanced read heads as well as two of the write heads are visible, since the other heads are hidden by the head wheel 31. The angular spacing of the advanced read heads from the normal read heads is less than about $\frac{1}{3}$ of the angle of rotation of the head wheel within which a point on the head wheel is out of contact with the tape and is such that while and advanced read head is reading an audio section of a track on the tape, one of the normal read heads is out of contact with the tape.

Three groups of magnetic heads, the members of each group spaced by 90° around the periphery are provided on the head wheel 31. These groups are constituted of the write heads W1, W2, W3 and W4, the normal read heads R1, R2, R3 and R4, and the advanced read heads AR1, AR2, AR3 and AR4. As shown in FIG. 2, every track is first passed over by one of the advanced read heads AR, then passed over by one of the write heads W and finally by one of the normal read heads R. It is thus possible, on the one hand, to produce an after-check of the signals recorded by the write heads W by means of the normal read heads R. On the other hand, it is possible to read already recorded signals by means of the advanced read heads AR to process the read-out signals with the use other signals and then to record the processed signals by means of the write heads W. Finally the signals thus processed and recorded can also be subjected to an after-check by the normal read heads R.

Figure 5:
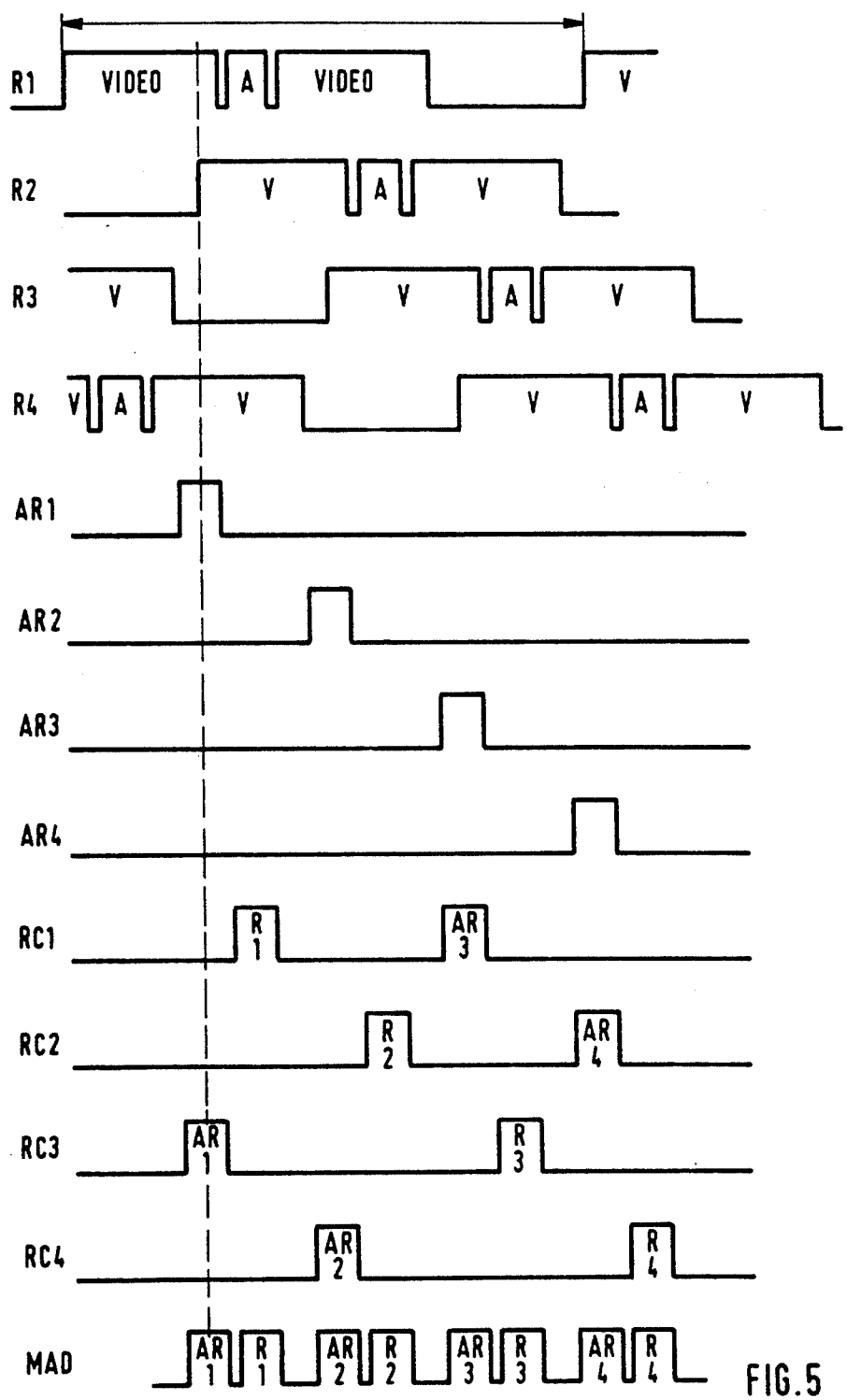
FIG. 5 is a timing diagram showing digital signals read out from the tape.

FIG. 5 shows the data read out by the various read heads as illustrated by timing diagrams. Between the sections V filled with video data recorded on a track there is in every case a section A filled with audio data. As is illustrated in FIG. 5 for each of the normal read heads R1 ... R4, because of the 90° offset of the successive normal read heads R1 ... R4 the read out signals are correspondingly offset in time. During about 30% of a head wheel revolution each of the read heads is not in contact with the tape, so that during this time interval no data is read out on the particular read head.

In the case of the advanced read heads AR1 ... AR4 only the audio data are shown in FIG. 5. The advanced read heads AR1 ... AR4 are so disposed on the head wheel that the audio data read out by each of them and by the corresponding normal read heads do not overlap in time and that the track sections 25 are read out by one of the advanced read heads while a normal read head situated approximately opposite it on the head wheel is out of contact with the tape. Thus, for example, the audio data read out by the advanced read head AR1 are read out during the gap in the data stream read out by the normal read head R3. By means of switching arrangements which will be further explained in connection with FIG. 6, a data stream MAD (multiplex audio data) can be generated which is illustrated in the lowest line of FIG. 5. The lines RC1 . . . RC4 will also be explained by reference to FIG. 6.

Figure 6:
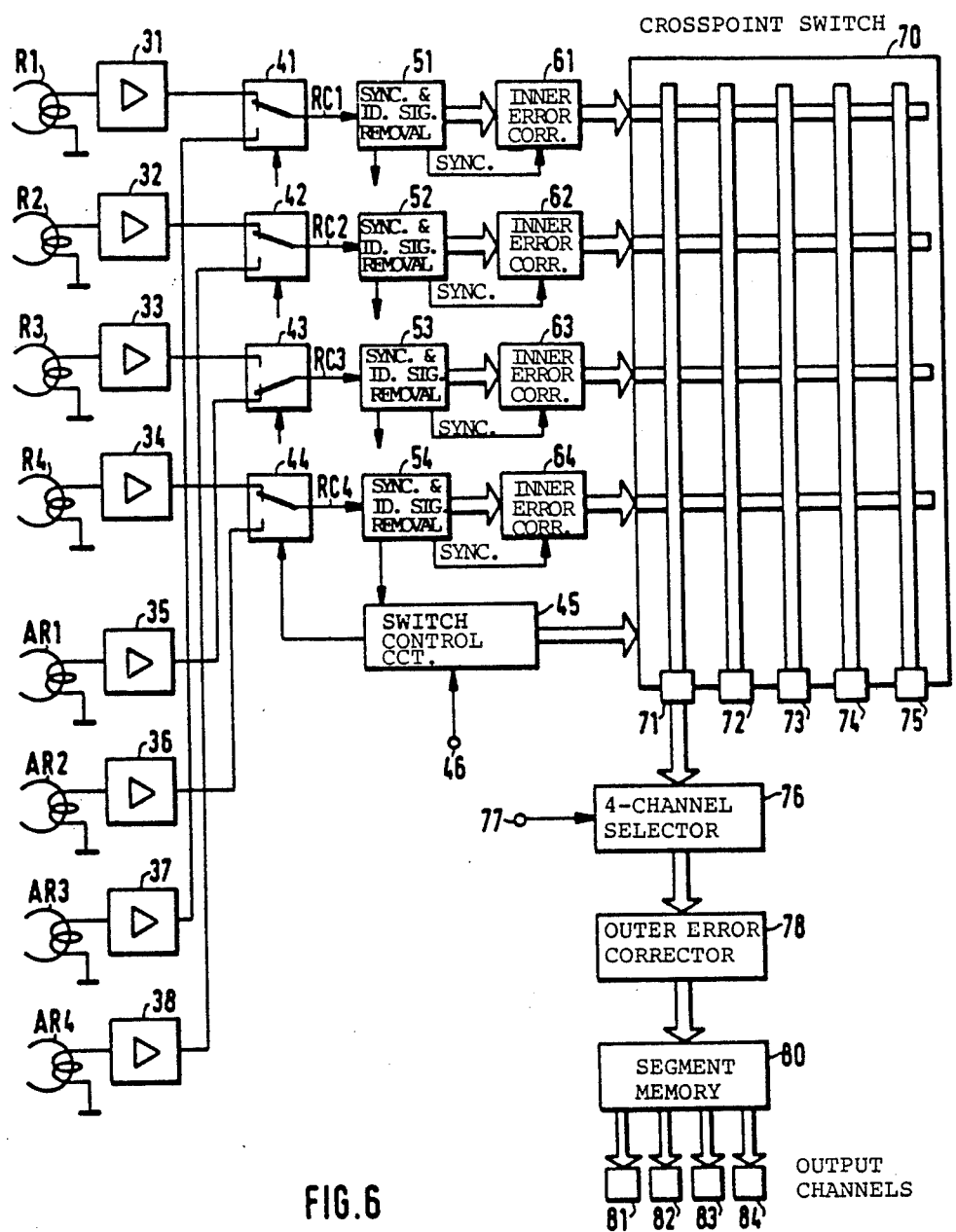
FIG. 6 is a block circuit diagram of an embodiment of the invention utilizing a head wheel in accordance with FIG. 3.

As shown in the circuit block diagram of FIG. 6 the signals respectively produced by the normal read heads R1 . . . R4 and the advanced read heads AR1 . . . AR4 are first prepared for further processing in individual signal preparation circuits 31 . . . 38. Each of these signal preparation circuits provides for amplification, removal of distortion of the frequency characteristic and quantization in both the amplitude domain and the frequency domain, so that digital signals ready for processing are made available at the outputs of the circuits 31 . . . 38.

Figure 3:
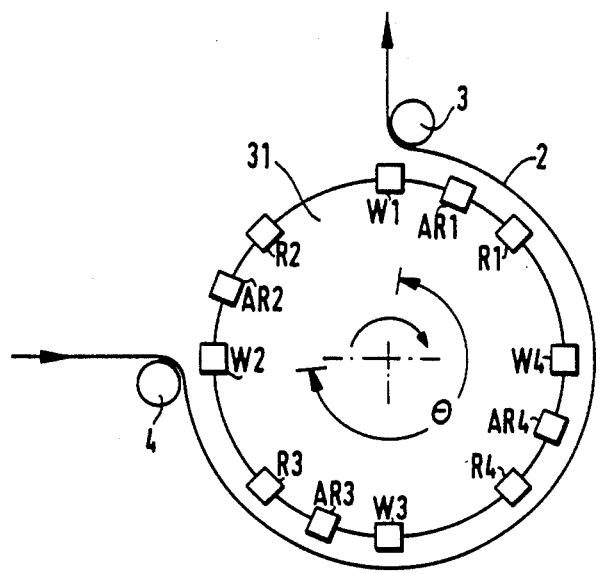
FIG. 3 is a schematic top view of a head wheel of equipment according to the present invention.

Four changeover switches 41 . . . 44 are provided, each of which provides an output selectively chosen either from the signal preparation circuit of one of the normal read heads or from the signal preparation circuit of one of the advanced read heads. The outputs of the changeover selector switches 41 . . . 44, together with following circuits, form the read-out channels RC1 . . . RC4, which however do not correspond the four audio channels of a television signal because of the (shuffled) distribution of the data on the magnetic tape in accordance with the recording standard mentioned in the introduction to the specification. The changeover switches 41 . . . 44 are controlled by the control circuit 35 in a manner dependent upon the contemporary position of the head wheel (FIG. 3) so that the signals shown in the bottom five lines of FIG. 5 are produced. The positions of the switches 41 . . . 44 shown in FIG. 6 correspond to the instant designated in FIG. 5 by a vertical broken line. At this instant the signals of the normal read head R1, R2 and R4 and the signal of the advanced read heads AR1 are passed through the switches 41 . . . 44 for further processing. It is evident that the switches 41 . . . 44 remain in their upper positions for a predominant portion of each head wheel revolution. They each switch over the lower position only during the appearance of audio data from an advanced read head situated opposite to the normal read head to which they are connected most of the time. Thus, for example, the switch 41 is brought into its lower position of FIG. 6 only for a short period in which there appears the data designated AR3 in FIG. 5.

The output signals of the switches 41 . . . 44 are respectively supplied to further circuits 51 . . . 54 in which the synchronizing signals and identification signals provided at the beginning of each data block are separated and a series to parallel conversion of the digital data is performed. The data streams now in parallel sample form are then supplied to circuits 61 . . . 64 in which a so-called inner error correction and sample rate synchronizing are performed.

Until they reach the ciruits 61 . . . 64 the signals of the normal read heads R1 . . . R4 and of the advanced read heads AR1 . . . AR4 are not locked in a permanent phase relation with each other. Such a phase relation is, however, needed for further processing in which signals from several heads are needed at the same time and must be synchronized.

Details regarding the circuits 51 . . . 54, 61 . . . 64, as well as the controlling of the cross-point switch 70 presently to be discussed are more explicitly disclosed in the following co-pending applications already cross-referenced at the beginning of the specification: Ser. No. 07/198,135, filed May 24, 1988; Ser. No. 07/198,131, filed May 24, 1988; Ser. No. 07/193,903, filed May 13, 1988.

The cross-point switch 70 is controlled in such a way that the multiplexed audio data stream MAD shown in FIG. 5 appears at the output 71. At the outputs 72 . . . 75 of the cross-point switch 70 video data are made available, the further processing of which is not of interest in connection with the present invention and is therefore not shown in FIG. 6. A circuit 76 is connected to the outputs 71 of the cross point switch 70 and serves for channel selection under control signals supplied from a control signal source 77. These control signals provide information regarding which four of the eight audio signals of the multiplex signal MAD should be passed on for further processing. An example of the use of four of the eight audio signals is given in FIG. 7. It is well understood the art of how this type of timed switching can be provided and that does not need to be further illustrated here in connection with the present invention.

A circuit 78 for a so-called outer error correction with its input connected to the output of the circuit 76. An advantageous circuit configuration for the circuit 78 is described in a copending patent appliation, Ser. No. 07/202,192, filed June 2, 1988.

Following the circuit 78 a so-called segment memory 80 is provided, by means of which a deshuffling operation can be carried out in accordance with the television recording standard previously mentioned. In addition, delay of the audio signals that may be necessary in the particular case may be carried out by means of the segment memory 80 so that the audio signals will be correctly contemporaneous with the video signals.

The four audio channels selected by the circuit 76 are separately read out from the segment memory 80 and are respectively made available at the outputs 81 . . . 84.

It is evident from FIG. 3 through 6 that the arrangement of the advanced read heads in accordance with the invention makes possible substantial reduction of the expense of audio processing circuits and at the same time assures unimpeded availability of the normal read heads and of the signals obtained by the advanced read heads. As a result, the inherently expensive circuits 51 . . . 54 and 61 . . . 64 are needed only in fourfold availability. Only a single circuit 78 is necessary for error correction for audio signals selected by the circuit 76.

Figure 7:
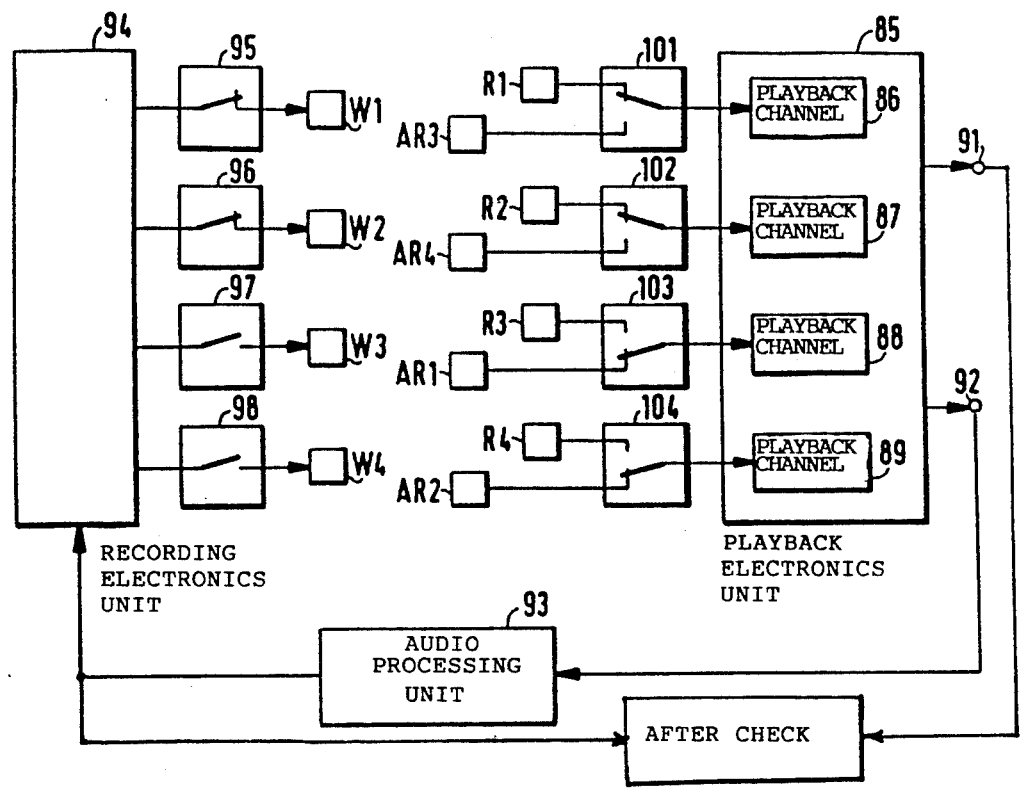
FIG. 7 is a block circuit diagram for an editing operation made possible by the invention.

A further aspect of the invention which requires only four channels of the processing of audio signals picked up from the tape and enables practically simultaneous rerecording on the same track, is explained below with reference to FIG. 7. In this explanation no account is taken of the details of the circuit of FIG. 6 (collection of the audio signals into a multiplexer signals MAD). Only the overall resulting signal course is illustrated by the circuit block diagram of FIG. 7. FIG. 7 relates to the task of processing signals, for example of so-called stereo air of audio channels, which are recorded in two of the four available audio channels, the processing including reading the signals from the tape, processing them, rerecording them on the same tracks and after-checking the recording.

In the arrangement of FIG. 7 changeover switches 101 ... 104 are provided between the normal read heads R1 ... R4 and the playback electronics unit 85. The switches 101 ... 104 make possible the connection of the playback channels 86 ... 89 to the advanced read heads AR1 ... AR4. The playback electronics unit 85 also has two outputs 91 and 92, each of them for two channels, which can be connected with two of the outputs of the playback channels 86 ... 89. The output 92 is connected through a unit 93 of a known kind for processing audio signals for an input of the recording electronics unit 94 by which two of the recording heads W1 ... W4 can be selected for recording of the two-channel signals from the output 92 of the playback electronics unit 85 which have been processed by the unit 93. This selection of recording channels is diagrammatically illustrated by the switches 95, 96, 97 and 98.

When the position of the switches is as shown in FIG. 7 the following mode of operation results.

The signals read out from the advanced read heads AR1 and AR2 are prepared for processing in the playback channels 88 and 89 and supplied through the output 92 of the unit 85 to the processing unit 93. There they are, for example, mixed with other digital audio signals or modified in some other way. Processed audio signals are then supplied through the recording electronic unit 94 to the recording heads W1 and W2 and recorded in the magnetic tape. An after-check of the two channels thus edited is then possible by means of the normal read heads R1 and R2, the playback channels 86, 87 and the output 91. The four audio channels, as mentioned at the beginning, are not individually assigned to tracks. For reasons of distribution of errors the relation of recording channels to tracks changes from sector to sector of the audio recording. This interchange is thoroughly described in the above-mentioned printed publication and is not taken account of in the illustration of FIG. 7 in order to make the illustration more readily intelligible.

Although the invention has been described with reference to particular illustrative examples, it is to be understood that modifications and variations are possible within the inventive concept.

We claim:

1. Apparatus for reproducing audio signals which are recorded as digital signals on track sections allocated thereto in tracks on a magnetic tape also used for recording digital video signals, said apparatus having a rotary head wheel having four write heads and four normal read heads, for recording and reproducing audio and video signals on and from oblique tracks on said tape, said read heads being located for reading recorded signals of said tape during time intervals following the time intervals in which the respective write heads pass over the same respective track portions, and four advanced read heads so disposed on said head wheel that said advanced read heads read recorded signals of said tape during time intervals which precede the time intervals in which the respective write heads pass over the respective track portions in which the same signals were previously recorded, and wherein, in accordance with the invention:

said write heads are spaced at substantially equal intervals around the head wheel circumference, said normal read heads are spaced at substantially equal intervals around the head wheel circumference and said advance read heads are spaced substantially equal intervals around the head wheel circumference;

said advanced read heads are positioned in a first plane of said head wheel, said write heads are positioned in a second plane, different from and parallel to said first plane, of said head wheel and said normal read heads are positioned in a third plane of said head wheel different from and parallel to said first and second planes, and said advanced read heads are disposed at such an angular spacing from the respectively nearest thereto of said normal read heads that while one of said advanced read heads is reading a section of track on said tape allocated to audio signal recording, the one of said normal read heads which is nearest to being located on said head wheel diametrically opposite to said one of said advanced read heads is out of contact with said tape, said angular spacing being less than about ⅓ of the angle subtended by the portion of the circumference of said head wheel which is out of contact with said tape.

2. Apparatus according to claim 1, including also means for combining digital audio signals read out by said normal read heads and audio signals read out by said advanced read heads into time sequenced signals in which readouts from a normal read head and from an advanced read head are interleaved without intermixing and means for processing said time sequenced signals for selecting and collecting the portions thereof belonging to respective individual audio channels.

3. Apparatus according to claim 2, wherein each of said normal read heads and the said advanced read head which is nearest to being diametrically opposite the relevant normal read head are respectively connectable, in each case through a signal preparation circuit individual for each head to respective fixed contacts of a two-position selector switch, said switch having a selector contact connected to the input of a signal transmission channel common to the respective advanced read head and normal read head.

4. Apparatus according to claim 3, wherein said signal reproduction channel which is connected selectively to one of said normal read heads and one of said advanced read heads contains at least means for separating synchronizing signals, means for serial to parallel conversion of digital signals, means for error correction of said digital signals, and digital signal audio sample rate synchronizing means.

5. Apparatus according to claim 4, wherein each of said signal transmission channels has an output connected to an input of a demultiplexer switch for sequencing the contents of said channels for further processing the contents in common processing circuits before distribution to deshuffled audio channels which correspond to audio channels of the recorded signals as they existed prior to shuffling for recording.

6. Apparatus according to claim 5, wherein said demultiplexer switch is a cross point switch for parallel digital audio signals.

7. Apparatus according to claim 3, wherein said selector contacts of a first and second of said two-position selector switches are connected respectively to first and second signal transmission channels which in turn are connected through audio processing means respectively to two of said write heads during suitable intervals for overwriting processed audio signals in place of audio signals respectively read by the two said advanced read heads, and the third and fourth of said two-position selector switches have their selector contacts connected respectively to signal transmission channels during suitable intervals for after-check comparison with signals furnished to said two write heads by said audio processing means.

8. Apparatus according to claim 4, wherein said selector contacts of a first and second of said two-position selector switches are connected respectively to first and second signal transmission channels which in turn are connected through audio processing means respectively to two of said write heads during suitable intervals for overwriting processed audio signals in place of audio signals respectively read by the two said advanced read heads, and the third and fourth of said two-position selector switches have their selector contacts connected respectively to signal transmission channels during suitable intervals for after-check comparison with signals furnished to said two write heads by said audio processing means.

9. Apparatus according to claim 5, wherein said selector contacts of a first and second of said two-position selector switches are connected respectively to first and second signal transmission channels which in turn are connected through audio processing means respectively to two of said write heads during suitable intervals for overwriting processed audio signals in place of audio signals respectively read by the two said advanced read heads, and the third and fourth of said two-position selector switches have their selector contacts connected respectively to signal transmission channels during suitable intervals for after-check comparison with signals furnished to said two write heads by said audio processing means.

10. Apparatus according to claim 6, wherein outputs of two of said advanced read heads (AR1, AR2) are connected through respective first two-position selector switches to respective first signal reproduction channels which in turn are connected through audio processing means (93) respectively to two of said write heads (W1, W2) for overwriting processed audio signals in place of audio signals respectively read by said two advanced read heads (AR1, AR2), and two of said normal read heads (R1, R2) are connected through two respective second two-position selector switches, different from said first two-position selector switches, to respective second signal reproduction channels, different from said first signal reproduction channels, for after-check comparison with signals furnished to said two write heads (W1, W2) by said audio processing means (93).

11. Apparatus according to claim 1, wherein the said normal read head and the said advanced read head provided for reading the same recorded tracks which are scanned by a particular one of said write heads, are angularly located on said head wheel within the quadrant of the circumference of said headwheel extending from said particular one of said write heads to the one of said write heads which precedes it in the normal direction of revolution of said head wheel.

12. Apparatus according to claim 11, wherein said advanced read head is located between the said write head and the said normal read head which scan the same tracks as said advanced read head.

13. Apparatus for reproducing audio signals which are recorded as digital signals on track sections allocated thereto in tracks on a magnetic tape also used for recording digital video signals, said apparatus having a rotary head wheel having four write heads and four normal read heads, for recording and reproducing audio and video signals on and from oblique tracks on said tape, said read heads being located for reading recorded signals of said tape during time intervals following the time intervals in which the respective write heads pass over the same respective track portions, and four advanced read heads so disposed on said head wheel that said advanced read heads read recorded signals of said tape during time intervals which precede the time intervals in which the respective write heads pass over the respective track portions in which the same signals were previously recorded, and wherein, in accordance with the invention:

said write heads are spaced at substantially equal intervals around the head wheel circumference, said normal read heads are spaced at substantially equal intervals around the head wheel circumference and said advance read heads are spaced substantially equal intervals around the head wheel circumference;

the said normal read head and the said advanced read head provided for reading the same recorded tracks which are scanned by a particular one of said write heads, are angularly located on said head wheel within the quadrant of the circumference of said headwheel extending from said particular one of said write heads to the one of said write heads which precedes it in the normal direction of revolution of said head wheel, and said advanced read heads are disposed at such an angular spacing from the respectively nearest thereto of said normal read heads, that while one of said advanced read heads is reading a section of track on said tape allocated to audio signal recording, the one of said normal read heads which is nearest to being located on said head wheel diametrically opposite to said one of said advanced read heads is out of contact with said tape, said angular spacing being less than about ⅓ of the angle subtended by the portion of the circumference of said head wheel which is out of contact with said tape.

14. Apparatus according to claim 13, wherein said advanced read head is located between the said write head and the said normal read head which scan the same tracks as said advanced read head.

15. Apparatus according to claim 13, including also means for combining digital audio signals read out by said normal read heads and audio signals read out by said advanced read heads into time sequenced signals in which readouts from a normal read head and from an advanced read head are interleaved without intermixing and means for processing said time sequenced signals for selecting and collecting the portions thereof belonging to respective individual audio channels.

16. Apparatus according to claim 15, wherein each of said normal read heads and the said advanced read head which is nearest to being diametrically opposite the relevant normal read head are respectively connectable, in each case through a signal preparation circuit individual for each head to respective fixed contacts of a two-position selector switch, said switch having a selector contact connected to the input of a signal transmission channel common to the respective advanced read head and normal read head.

17. Apparatus according to claim 16, wherein said signal reproduction channel which is connected selectively to one of said normal read heads and one of said advanced read heads contains at least means for separating synchronizing signals, means for serial to parallel conversion of digital signals, means for error correction of said digital signals, and digital signal audio sample rate synchronizing means.

18. Apparatus according to claim 17, wherein each of said signal transmission channels has an output connected to an input of a demultiplexer switch for sequencing the contents of said channels for further processing the contents in common processing circuits before distribution to deshuffled audio channels which correspond to audio channels of the recorded signals as they existed prior to shuffling for recording.

19. Apparatus according to claim 18, wherein said demultiplexer switch is a cross point switch for parallel digital audio signals.

20. Apparatus according to claim 15, wherein said selector contacts of a first and second of said two-position selector switches are connected respectively to first and second signal transmission channels which in turn are connected through audio processing means respectively to two of said write heads during suitable intervals for overwriting processed audio signals in place of audio signals respectively read by the two said advanced read heads, and the third and fourth of said two-position selector switches have their selector contacts connected respectively to signal transmission channels during suitable intervals for after-check comparison with signals furnished to said two write heads by said audio processing means.

* * * * *